United States Patent
Simon (10) Patent No.: US 9,635,837 B2
(45) Date of Patent: May 2, 2017

(54) PET TOY WITH BALL HOLDING FEATURE

(71) Applicant: THE KONG COMPANY, LLC, Golden, CO (US)

(72) Inventor: David F. Simon, Lakeland, FL (US)

(73) Assignee: The KONG Company, LLC, Golden, CO (US)

( * ) Notice: Subject to any disclaimer, the term of this patent is extended or adjusted under 35 U.S.C. 154(b) by 316 days.

(21) Appl. No.: 14/449,960

(22) Filed: Aug. 1, 2014

(65) Prior Publication Data

US 2016/0029598 A1 Feb. 4, 2016

(51) Int. Cl.
*A01K 15/02* (2006.01)

(52) U.S. Cl.
CPC .................. *A01K 15/026* (2013.01)

(58) Field of Classification Search
CPC ...... A01K 15/026; A01K 15/025; A63H 3/06; A63H 3/28; A63H 3/31; A63H 5/00
See application file for complete search history.

(56) References Cited

U.S. PATENT DOCUMENTS

| 1,858,460 | A | * | 5/1932 | Ranseen | A63H 27/10 |
| | | | | | 40/214 |
| 2,598,956 | A | * | 6/1952 | Wintriss | A63H 3/28 |
| | | | | | 446/184 |
| 2,845,747 | A | * | 8/1958 | Wintriss | A63H 5/00 |
| | | | | | 446/184 |
| 2,928,208 | A | * | 3/1960 | Wintriss | A63H 5/00 |
| | | | | | 411/918 |
| 3,032,920 | A | * | 5/1962 | Cohn | A63H 3/31 |
| | | | | | 116/139 |
| 3,699,704 | A | * | 10/1972 | Hakim | A63H 3/28 |
| | | | | | 428/7 |
| 3,830,012 | A | * | 8/1974 | Franke | A63H 3/006 |
| | | | | | 273/155 |
| 4,993,712 | A | | 2/1991 | Urwin | |
| 5,072,843 | A | * | 12/1991 | James | A61J 9/06 |
| | | | | | 215/11.1 |

(Continued)

FOREIGN PATENT DOCUMENTS

WO   WO 03/079807   10/2003

OTHER PUBLICATIONS

"Budget Tennis Ball with Thrower," PrintGlobe Item: P-PET101, retrieved on Apr. 15, 2016 from www.printglobe.com/pet-care-products/pet-toys/pet-toys/tennis-ball-with-thrower?utm_medium=shoppingengine&utm_source=googlebase&cvsfa=2132&cvsfe=2&cvsfhu=4e333835303543313339333036&gclid=Cj0KEQjwosK4BRCYhsngx4_SybcBEiQAowaCJWh_AV7ryGFUy-kFuXYNOuRJwWR5A9FJivLn6EX207oaAi_a8P8HAQ, 4 pages.

(Continued)

*Primary Examiner* — Kathleen Alker
(74) *Attorney, Agent, or Firm* — Berg Hill Greenleaf Ruscitti LLP (57) ABSTRACT

A pet toy comprises a flexible body having an exterior surface and a hollow interior chamber. A partial spherical shaped recess is formed on the exterior surface. A ball is received in the partial spherical shaped recess such that a first portion of an outer surface of the ball is covered by the recess, and a second portion of the outer surface is exposed and protrudes beyond the flexible body. A noise making module is disposed in the hollow interior chamber. The module has a noise making element mounted therein to produce sound when a force is applied to the flexible body to deflect the exterior surface of the flexible body.

25 Claims, 9 Drawing Sheets

(56) References Cited

U.S. PATENT DOCUMENTS

| | | | | |
|---|---|---|---|---|
| 5,114,376 A * | 5/1992 | Copley | ............... | A63H 3/006 446/369 |
| 5,740,756 A * | 4/1998 | Ord | ............... | G09F 17/00 116/173 |
| 5,809,938 A | 9/1998 | Baiera et al. | | |
| 5,888,117 A * | 3/1999 | Sutton | ............... | A63H 3/003 40/410 |
| 6,076,829 A | 6/2000 | Oblack | | |
| 6,092,489 A | 7/2000 | Huettner et al. | | |
| 6,112,703 A * | 9/2000 | Handelsman | ............... | A01K 15/026 119/707 |
| 6,216,640 B1 | 4/2001 | Zelinger | | |
| 6,234,863 B1 * | 5/2001 | Hughey | ............... | A63H 3/003 446/268 |
| 6,827,317 B1 * | 12/2004 | Maki Risaliti | ............... | A61J 9/06 248/102 |
| 6,991,509 B1 * | 1/2006 | Carley | ............... | A63H 5/00 434/334 |
| 7,169,008 B2 * | 1/2007 | Ritchey | ............... | A01K 15/025 119/702 |
| 7,298,284 B2 * | 11/2007 | Glime | ............... | G09B 19/12 340/691.1 |
| 2002/0115377 A1 | 8/2002 | Herrenbruck | ............... | A63H 5/00 446/475 |
| 2003/0079693 A1 * | 5/2003 | Jager | ............... | A01K 15/026 119/707 |
| 2005/0227572 A1 | 10/2005 | Ritchey | | |
| 2006/0292956 A1 * | 12/2006 | Sayles | ............... | A45C 1/12 446/8 |
| 2007/0099539 A1 * | 5/2007 | Fullmer | ............... | A63H 3/02 446/369 |
| 2008/0233829 A1 * | 9/2008 | Sayles | ............... | A45C 1/12 446/8 |
| 2009/0255482 A1 | 10/2009 | Santarsiero | | |
| 2012/0048251 A1 | 3/2012 | Oblack et al. | | |

OTHER PUBLICATIONS

"Chuckit! Sport Launcher," chewy.com, 2016, retrieved from www.chewy.com/chuckit-sport-launcher-18m/dp/38395?dept=dog&utm_source=google-product&utm_medium=cpc&utm_campaign=hg&utm_content=Chuckit%21&utm_term=&gclid=CjwKEAjwlq24BRDMjdK7g8mD6BASJABBI8n3ppLRaj1-AylA4FH7BEDJrhZGUHgCpuWrqxb_4LievhoCL_Pw_wcB, 6 pages.

"Dog Toy Belt Clip and Tennis Ball Red Portable Holder Spot Ethical Dogs Galore," eCRATER, Apr. 13, 2016, retrieved from www.ecrater.com/p/22037526/dog-toy-belt-clip-and-tennis?gps=1&id=112511193139, 4 pages.

"GoodPooch Flying Disk & Tennis Ball Pet Frisbee & Ball Dog Toy," 2015, retrieved from www.amazon.com/GoodPooch-Flying-Disk-Tennis-Frisbee/dp/B00XM2DDSO/ref=sr_1_184?ie=UTF8&qid=1460392255&sr=8-184&keywords=tennis+balls+dog+toys, 9 pages.

"Zanies Blooming Brights Tennis Ball Flower Pet Toy, Turquoise," Zanies, retrieved on Apr. 13, 2016 from www.amazon.com/Zanies-Blooming-Brights-Tennis-Turquoise/dp/B00BJAHK5I/ref=sr_1_288?ie=UTF8&qid=1460392405&sr=8-288&keywords=tennis+balls+dog+toys, 4 pages.

U.S. Appl. No. 14/180,518, filed Feb. 14, 2014, Mak.

* cited by examiner

PET TOY WITH BALL HOLDING FEATURE

FIELD OF THE INVENTION

The invention relates to pet toys, and more particularly, to a pet toy having a ball holding feature for releasably holding a ball in which the toy is functional for use with or without the ball. The invention also relates to a noisemaking module in the pet toy that can be activated in multiple ways to produce different sounds according to how an animal interacts with the pet toy.

BACKGROUND OF THE INVENTION

Chewable pet toys are known to provide many benefits for animals. Some of the benefits include keeping an animal occupied to reduce stress or boredom, to exercise the animal's jaws, and to clean the animal's teeth and gums. Flexible or elastomeric balls are well known as both pet and human toys. Balls can facilitate many activities for an animal. An owner can play fetch with the animal, the animal can chew on the ball, etc. A ball can be considered a type of chewable pet toy if the ball is pliable or flexible enough that the animal can repeatedly bite on the ball without destroying it. However, most balls are not intended to be animal chew toys. Recently, rubber balls with a felt covering similar to tennis balls have been used in various types of pet toy configurations. These types of balls are sold by themselves as pet toys, or may be incorporated within other structures.

One example of a pet toy that incorporates a ball with other features includes the U.S. Pat. No. 6,216,640. This reference discloses a bone shaped plastic toy with a tubular central portion and partial spherical sockets on each end of the central portion. The sockets are configured to receive and hold a replaceable play ball, such as a tennis ball.

Another example of a pet toy that incorporates a ball with other structure in a pet toy is disclosed in the US Publication No. 20090255482. This reference discloses a ball having a circumferential groove, and a plush body received within the groove when to join the ball and plush body. The ball is configured in two pieces and the two pieces are attached to one another by a threaded connection. The circumferential groove may be sized to match the thickness of the plush toy.

Another example of a pet toy that incorporates a ball with other structure in the pet toy includes the U.S. Pat. No. 6,076,829. This reference discloses a ball throwing apparatus including an elongated shaft with a half spherical cup attached at its distal end. The cup is designed to easily engage and pick up a ball for throwing without having to touch the ball with the hand or fingers.

There are also a number of pet toys that incorporate noise making devices, commonly referred to as "squeakers". These types of pet toys are typically made from a flexible elastomeric material, such as rubber, plastic, and various formulations thereof. When an animal chews on the toy, a hollow cavity or interior chamber of the toy is deflected such that air is forced through the squeaker device, thereby producing a sound.

Despite the vast number of pet toys that have been developed, most pet toys have but a single or primary feature which makes it attractive to the animal. Alternatively, such pet toys may have but a single or primary feature that encourages an owner to stimulate the animal with the toy and/or interact with the animal to provide play or exercise for the animal. Accordingly, there is still a need to provide a pet toy that may provide multiple benefits for both the animal and owner incorporated within a single toy in which the toy has distinct yet complementary functional features.

SUMMARY OF THE INVENTION

A pet toy is provided having a flexible body, an integral noisemaking module or assembly, and a ball that is releasably received in a recess or cavity in the body of the toy. In one function, the flexible body serves as a receptacle to releasably hold the ball. In another function, the combination of the flexible body and the ball provide an integrated chewable pet toy in which both the body of the toy and the ball can be chewed by an animal. In another function, the ball may be separated from the flexible body so that the owner may independently stimulate the animal with either the ball or the flexible body of the toy.

The pet toy may have the shape of an animal, and the exterior shape of the pet toy may be molded to provide discernible features of an animal such as legs, paws, head, mouth, eyes, teeth, and nose. When the ball is received in the recess or cavity of the body, the ball represents a portion of the front torso of the animal, such as the belly of the animal. When removed, a half spherical or partial spherical shaped recess or cavity is exposed.

In a preferred embodiment, the flexible body has an integral noisemaking module or assembly. The module is located within the hollow interior or chamber of the pet toy. The module is defined by a housing and at least one noise making element or squeaker disposed within the housing. The squeaker is mounted to a wall of the module that is offset or separated from the outer surfaces of the toy resulting in the squeaker being placed in a protected location when an animal contacts the outer surfaces of the toy. Accordingly, pressure placed against the outer surfaces of the pet toy will not result in damage to the squeaker because the squeaker remains in a protected position that prevents forces from being transferred to the squeaker from deflection of the outer surfaces. Further, the housing of the module keeps the squeaker in a supported position so that air may be evacuated from and passes into the module as an animal bites or chews and then releases the toy. The module may have two or more squeakers mounted within respective protective covers of the housing. Multiple squeakers provide options for producing different types of sound that may better stimulate the animal.

The body of the toy is preferably made from a flexible, elastomeric material so that when an animal bites or chews on the toy, the exterior surface of the toy can deflect resulting in a change of shape in the interior chamber of the toy. As the exterior surface of the pet toy is deflected, air is forced to flow through one or more squeakers mounted in the module housing and through a vent opening in the module housing causing the squeaker(s) to produce sound. As the animal releases pressure against the exterior surface of the toy, the interior chamber of the toy re-inflates, thereby causing air to pass in a reverse direction through the squeaker(s) back into the interior chamber causing production of a second different sound.

The squeaker can be activated in different ways. The squeaker can be activated when the ball is secured to the body of the toy such that the animal biting on the toy causes deflection of either the body of the toy, the ball, or a combination of the two. When the body of the toy is deflected, this results in a compression of the interior chamber of the toy causing air to pass through the noise making module and squeaker. If the toy is chewed such that the ball is deflected (and the body of the toy is restrained or held in place), force is transferred from the deflected ball to deflect the cavity of the body that holds the ball, and this secondary deflection of the body therefore compresses the interior chamber of the toy causing air to pass through the noise-making module and squeaker. If the toy is chewed such that both the ball and the flexible body of the toy are deflected, this also results in deflection of the cavity or recess that receives the ball as well as deflection of the exterior surface of the toy therefore again compressing the interior chamber of the toy causing air to pass through the squeaker.

The flexible and preferably elastomeric body of the pet toy functions similar to a bellows device and reverse bellows device to produce sound. The types of sounds produced by the squeakers depend upon the amount of force and acceleration applied to the body of the pet toy which affects the volume and flow rate of air moving through the noisemaking module. For example, a smaller volume of air passing through the squeaker module by lightly depressing the body of the toy or the ball may activate only one of the squeakers to produce a first tone. As the previous, lightly depressed interior chamber of the pet toy re-inflates, air passes back through the noisemaking module in a reverse direction, thereby producing a second different tone. A larger volume of air moving at a higher flow rate through the squeaker module by more forcefully depressing the body and/or ball of the toy may activate both squeakers to produce a third tone, which is a combination of tones emitted from both of the squeakers. As the previous, more forcefully depressed interior chamber of the pet toy re-inflates, air passes back through the squeaker module in the reverse direction thereby producing yet a different fourth tone, which is a combination of tones emitted from both of the squeakers.

The material chosen for the squeaker module may also be flexible and elastomeric like the body of the toy, which therefore allows the squeaker module to deflect in a manner responsive to pressure applied by the bite of an animal. The material for the squeaker module however may be stiffer than the material for the body of the toy, thereby providing some amount of additional protection for the squeaker(s) mounted within the squeaker module.

Considering the above described feature of the invention, in one aspect, it may be considered a pet toy comprising (i) a flexible body having an exterior surface and a hollow interior chamber; (ii) a partial spherical shaped recess formed on said exterior surface; (iii) a ball received in said partial spherical shaped recess such that a first portion of an outer surface of said ball is covered by said recess, and a second portion of said outer surface is exposed and protrudes beyond said flexible body; and (iv) a noise making module disposed in said hollow interior chamber, said module having a noise making element mounted therein to produce sound when a force is applied to said flexible body to deflect said exterior surface of said flexible body.

In another aspect of the invention, it may be considered a pet toy comprising (i) a flexible body having an exterior surface and a hollow interior chamber, said flexible body being formed in the shape of an animal having a head and a torso; (ii) a partial spherical shaped recess formed on said exterior surface; (iii) a ball received in said partial spherical shaped recess such that a first portion of an outer surface of said ball is covered by said recess, and a second portion of said outer surface is exposed and protrudes beyond said flexible body; and wherein said partial spherical shaped recess is formed on a front torso portion of said body, and said ball when received in said partial spherical shaped recess resembles a belly of an animal.

In yet another aspect of the invention, it may be considered a pet toy comprising (i) a flexible and elastomeric body having an exterior surface and a hollow interior chamber; (ii) a partial spherical shaped recess formed on said exterior surface; and (iii) a noise making module disposed in said hollow interior chamber, said module having a noise making element mounted therein to produce sound when a force is applied to said flexible body to deflect said exterior surface of said flexible body.

In yet another aspect of the invention, it may be considered a method of providing interaction between and animal and a toy, said method comprising (a) providing a pet toy having (i) a flexible body having an exterior surface and a hollow interior chamber; (ii) a partial spherical shaped recess formed on said exterior surface; (iii) a ball received in said partial spherical shaped recess such that a first portion of an outer surface of said ball is covered by said recess, and a second portion of said outer surface is exposed and protrudes beyond said flexible body; and (iv) a noise making module disposed in said hollow interior chamber, said module having a noise making element mounted therein; (b) giving the pet toy to the animal allowing the animal to bite or chew on the toy, wherein deflection of the flexible body in response to biting or chewing produces a sound by said noise making element; and (c) removing the ball from said partial spherical shaped recess enabling the animal to independently play with the ball or the flexible body.

The aforementioned features and aspects of the invention are set forth in more detail with respect to the description of the figures and the accompanying detailed description of the figures.

DETAILED DESCRIPTION

Figure 1:
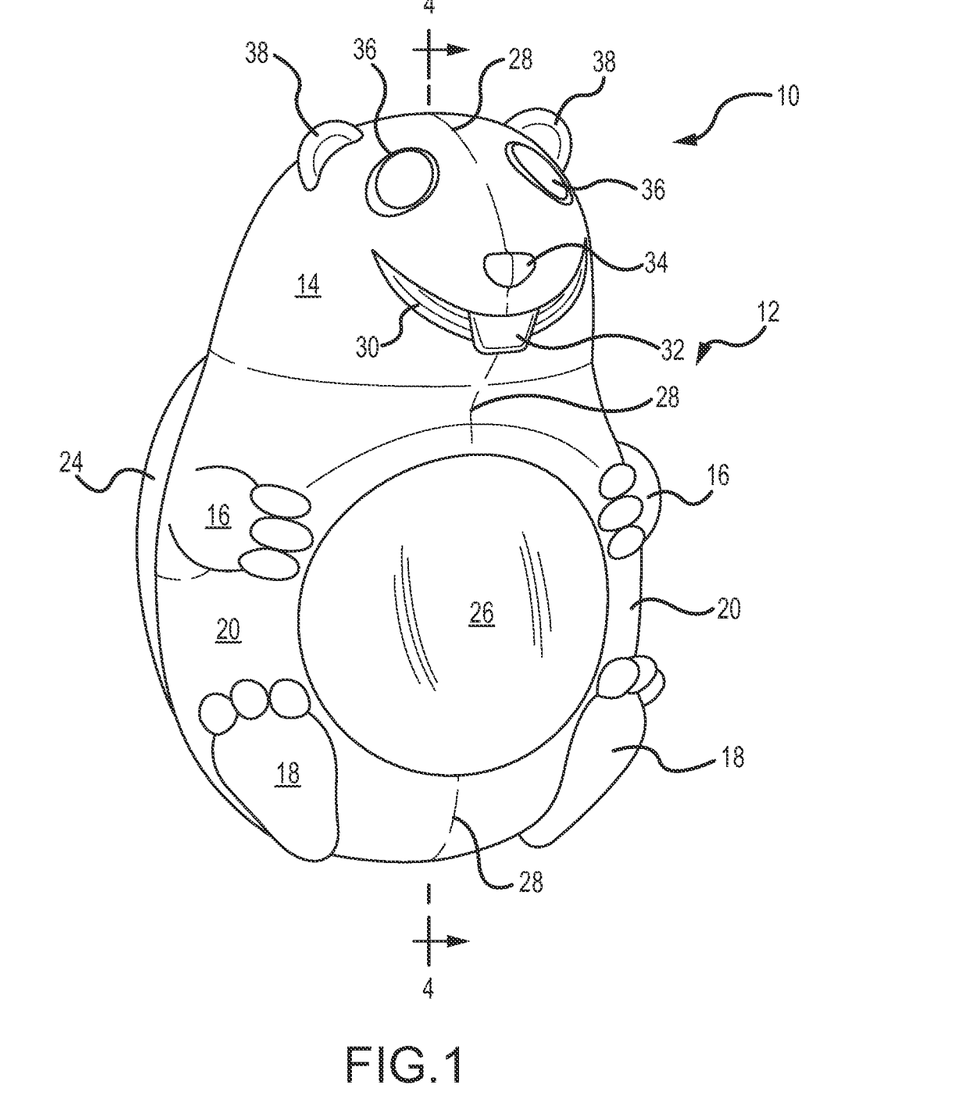
FIG. 1 is a front perspective view of a first embodiment of the invention.

FIG. 1 illustrates the pet toy 10 in the shape of an animal, such as a squirrel, beaver, gopher, or other type of rodent.

The body 12 of the pet toy is preferably flexible and elastomeric, allowing the exterior surface of the pet toy to deflect in response to the biting or chewing action of an animal. The exterior or outer surface of the pet toy has features defining the shape of the animal depicted by the toy. Specifically, the body 12 includes a head portion 14 connected to a front torso portion 20.

Figure 2:
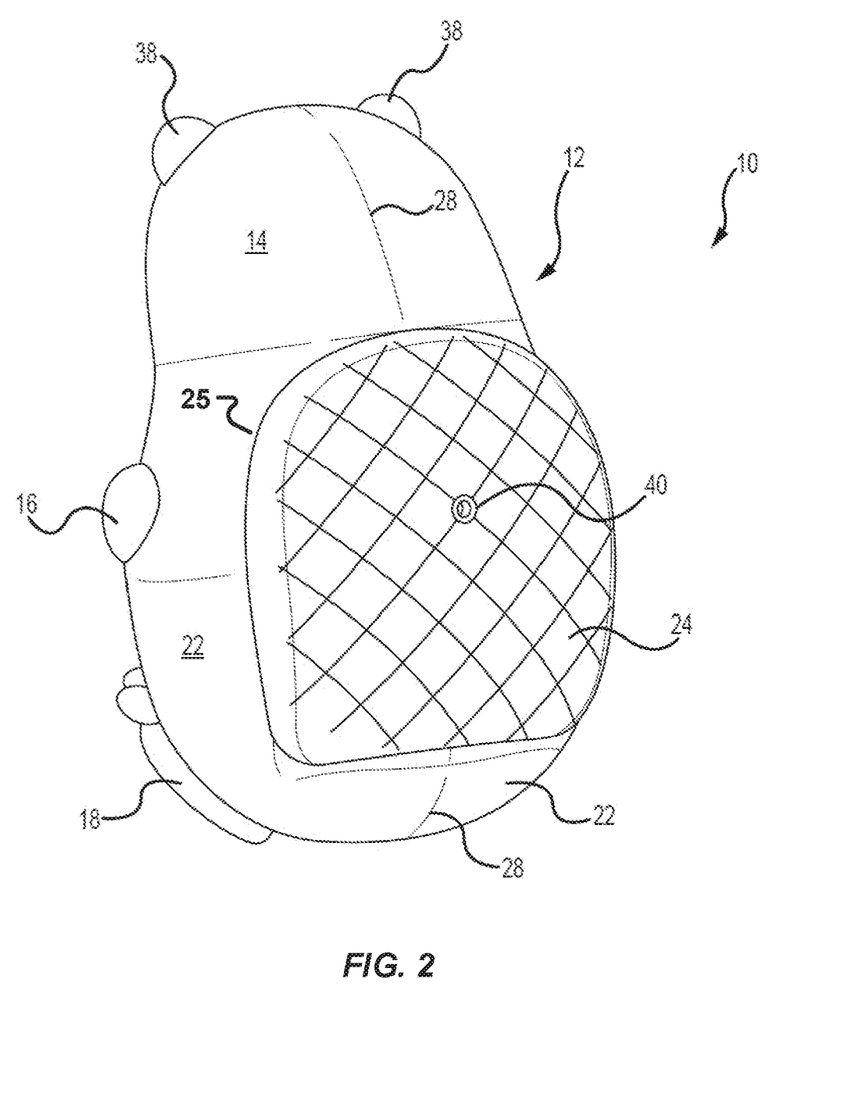
FIG. 2 is a reverse perspective view of the embodiment of FIG. 1.

Referring also to FIG. 2 and the reverse perspective view of the toy, the head portion 14 is also shown connected to a rear torso portion 22. A partial spherical shaped cavity or recess 26 is formed on the front torso portion 20. Front legs and paws 16 as well as rear legs and paws 18 extend generally from the front torso portion 20. Other features defining the animal depicted include a mouth 30, teeth 32, a nose 34, eyes 36, and ears 38. A part line 28 is shown which may indicate one possible method of making the toy, namely, that the toy is molded in two pieces and the pieces joined to along the part line 28. A squeaker module cover 24 is secured to the rear torso portion 22 of the toy. A vent opening 40 is formed on the cover 24.

Figure 3:
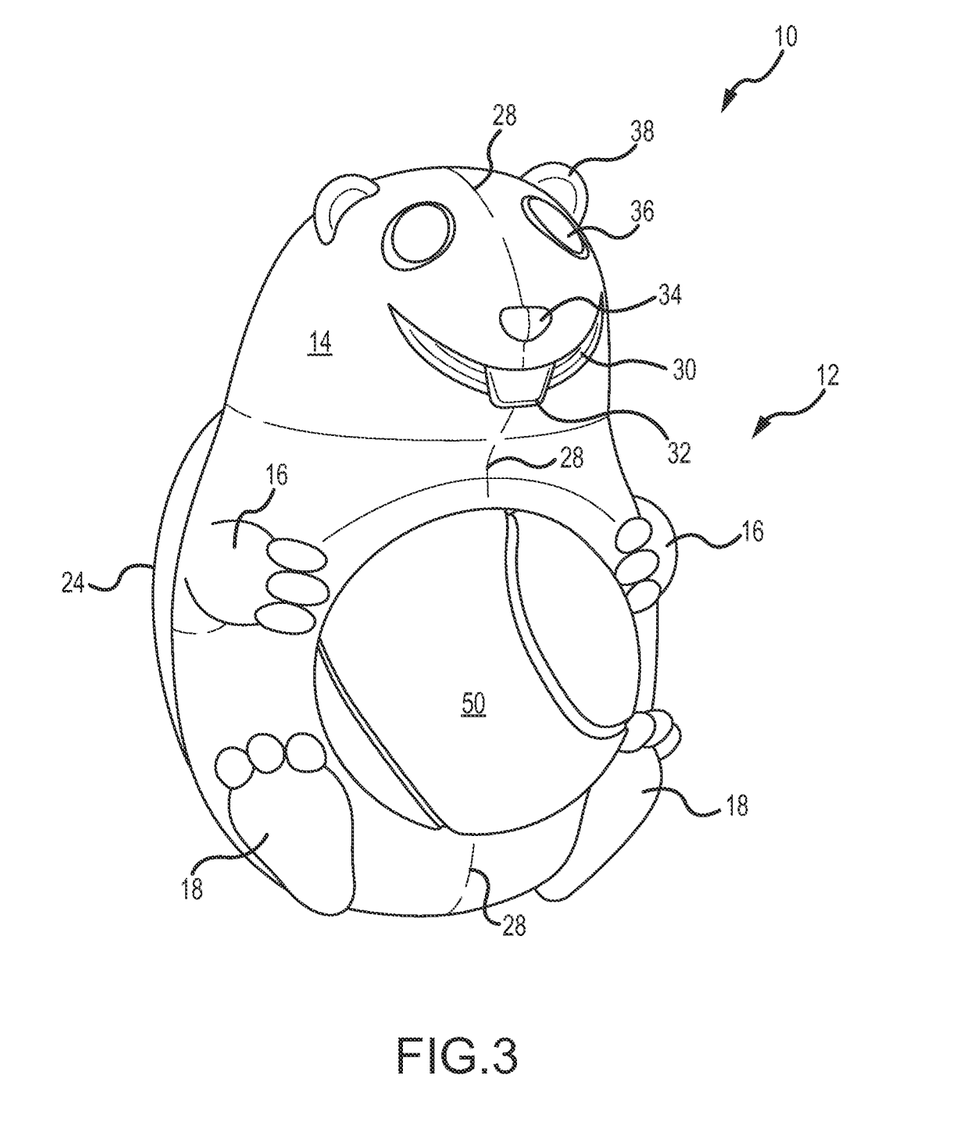
FIG. 3 is another front perspective view of the embodiment of FIG. 1 showing a ball attached to the toy.

As shown in FIG. 3, the recess 26 receives a ball 50 and is sized to frictionally hold the ball. The ball 50 may represent the belly of the animal.

Figure 4:
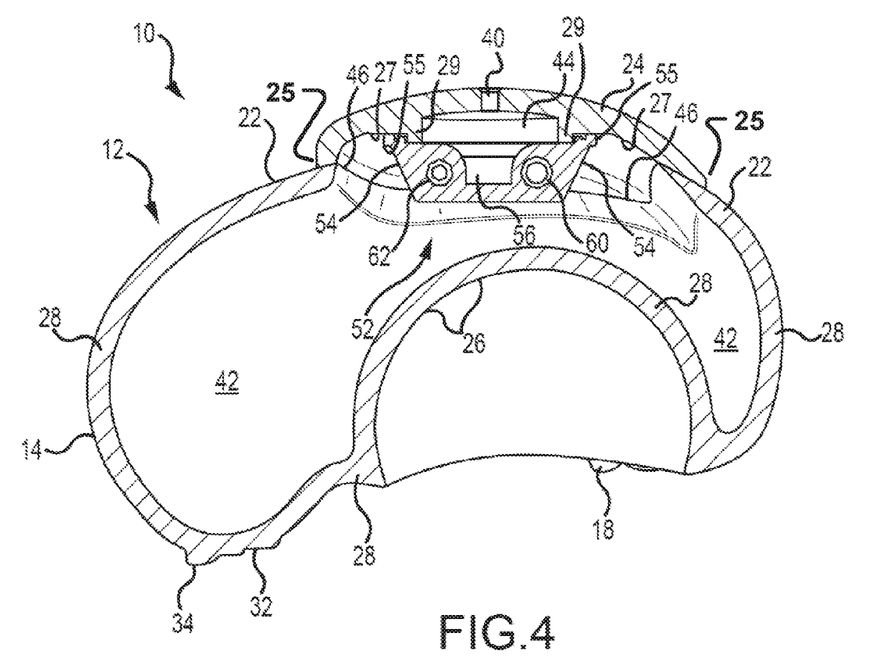
FIG. 4 is a cross-sectional view taken along line 4-4 of FIG. 1.

Referring to FIG. 4, a cross-sectional view is illustrated showing interior details of the toy. The body 12 further defines an interior open space or cavity 42. The recess 26 as shown with the partial spherical shaped and is especially adapted for holding a round ball. The squeaker module cover 24 covers and attaches to a squeaker module or assembly 52. The peripheral edges 25 of the cover 24 are attached to the exterior surface of the rear torso portion 22 as shown. The squeaker module 52 is mounted to the interior surface 27 of the cover 24 and extends into an opening 46 that is formed in the rear torso portion 22. Accordingly, the module 52 moves freely with the movement of the cover 24 as it may deflect or compress during contact. The upper peripheral edge 55 of the module 52 is preferably sealed with respect to the interior surface 27. To facilitate a more predictable seal, the interior surface 27 may include a complementary shaped projection 29 that fits within the peripheral edge 55 and is sealed thereto. By sealing the module 52 to the interior surface 27 of the cover 24, air is assured to flow through the squeakers 60 and 62 to maximize the noise producing capability of the toy. Further, it is preferable to also seal the peripheral edges 25 of the cover 24 to the outer surface of the toy to further ensure that air passes through the squeakers 60 and 62, to maximize sound production when the toy is compressed.

The squeaker module 52 and noise making elements mounted therein may be the same as disclosed in the co-pending patent application Ser. No. 14/180,518, this application being incorporated herein by reference for purposes of disclosing details of the squeaker module 52 and noise making elements. Features of the squeaker module 52 include a sidewall or housing 54 that houses one or more noise making elements, shown as a first squeaker 60 and a second squeaker 62. A continuous gap or open space is found between the squeaker module 52 and the interior surface of the cover 24, shown as a recess 44 formed in the cover 24 and an opposing recess 56 formed within the module 52. The recess 44 communicates with a vent opening 40.

A compression force applied to the pet toy to deflect or deform the exterior surface of the pet toy causes air to pass from the interior chamber 42 of the toy and through one end of a channel in the housing 54 that communicates with the interior chamber 42. The channel is an opening or passageway formed through the housing 54 that receives a corresponding squeaker 60/62. In the event two squeakers are used as shown in FIG. 4, there are two channels formed in the housing 54 and which independently communicate with the interior chamber 42. Air then travels through the corresponding squeaker 60/62 thus through the opposite end of the channel that holds the squeaker, and into the open area defined by opposing recesses 56 and 44. Air escapes the toy through the vent opening 40 that communicates with the recess 44. As the pet toy re-inflates upon release of the compression force, air re-enters the vent opening 40, passes into the open space defined by the recesses 44 and 56, back through the squeaker(s) 60/62, and into the interior chamber 42. Preferably, the pet toy 10 is made from a resilient thermoplastic or rubber that can withstand repeated biting actions by an animal, yet the toy remain flexible and elastic enough to allow deflection of the toy so that air can pass through the vent opening 40 of the toy without requiring excessive force.

The squeakers 60 and 62 are shown as being of different size to indicate that the squeakers can produce distinct sounds. For example, the squeakers may each have their own threshold air flow requirement to produce a sound, such as one with a distinct pitch or volume. However, it shall be understood that multiple noise making elements are not required, and that multiple such elements simply provide additional functionality to the invention for types of sounds that may be produced.

Referring again to FIG. 3 as mentioned, the ball 50 is secured within the recess 26 and the ball 50 may visually represent the belly of the animal. According to one feature of the invention, the recess 26 serves as a receptacle to hold the ball 50 so that an animal may bite or chew on the body of the toy, and/or the ball 50 to produce sound. For example, if the animal places both the body 12 of the toy 10 and the ball 50 in its mouth, a compression force caused by chewing or biting will result in deformation of the outer surface of the toy and therefore compression of the interior chamber 42, causing a flow of air through the noisemaking assembly 52 to produce sound. If the animal bites only on the body 12 and not the ball, this action also results in compression of the interior chamber 42 to produce sound. If the animal bites only on the ball 50, and assuming that the body 12 of the toy is stabilized or held in place, such as by the animal's paws, the force transferred to the ball by the animal may also result in some amount of force transferred to the deform the recess 26 which may also compress the interior chamber 42 resulting in the production of sound. According to another feature, the ball may be selectively removed by the pet owner, and the pet owner may choose how to interact with the animal such as throwing the ball for a game of fetch or allowing the animal to play with either the ball or toy 10 separately. The combination of the body of the pet toy with a removable ball provides many options for occupying an animal, and options also for the owner to choose the type of interaction to be conducted with the animal.

Figure 5:
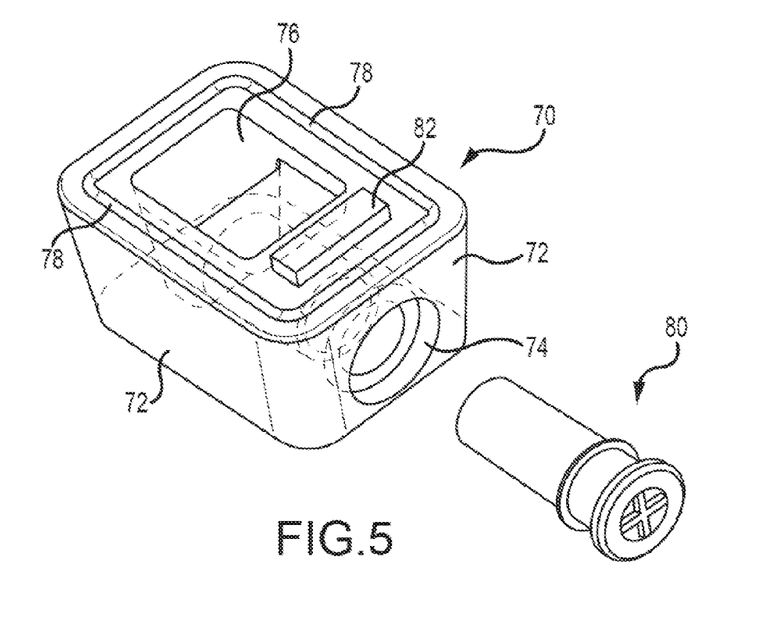
FIG. 5 is an enlarged exploded perspective view of a squeaker module of a second embodiment.

Referring to FIG. 5, a second embodiment is illustrated with respect to another type of noise making module 70. The module 70 includes a housing 72 and an opening 74 formed on one side of the housing 72 that receives a noise making element 80, shown as a conventional squeaker such as disclosed in the co-pending patent application Ser. No. 14/180,518. A cavity 76 is formed within the housing 72, and the opening 74 communicates with the cavity thereby providing a space for storage of the squeaker 80 therein. An upper surface of the module 70 according to the view of FIG. 5 has a peripheral sealing channel 78 and an alignment flange 82.

Figure 6:
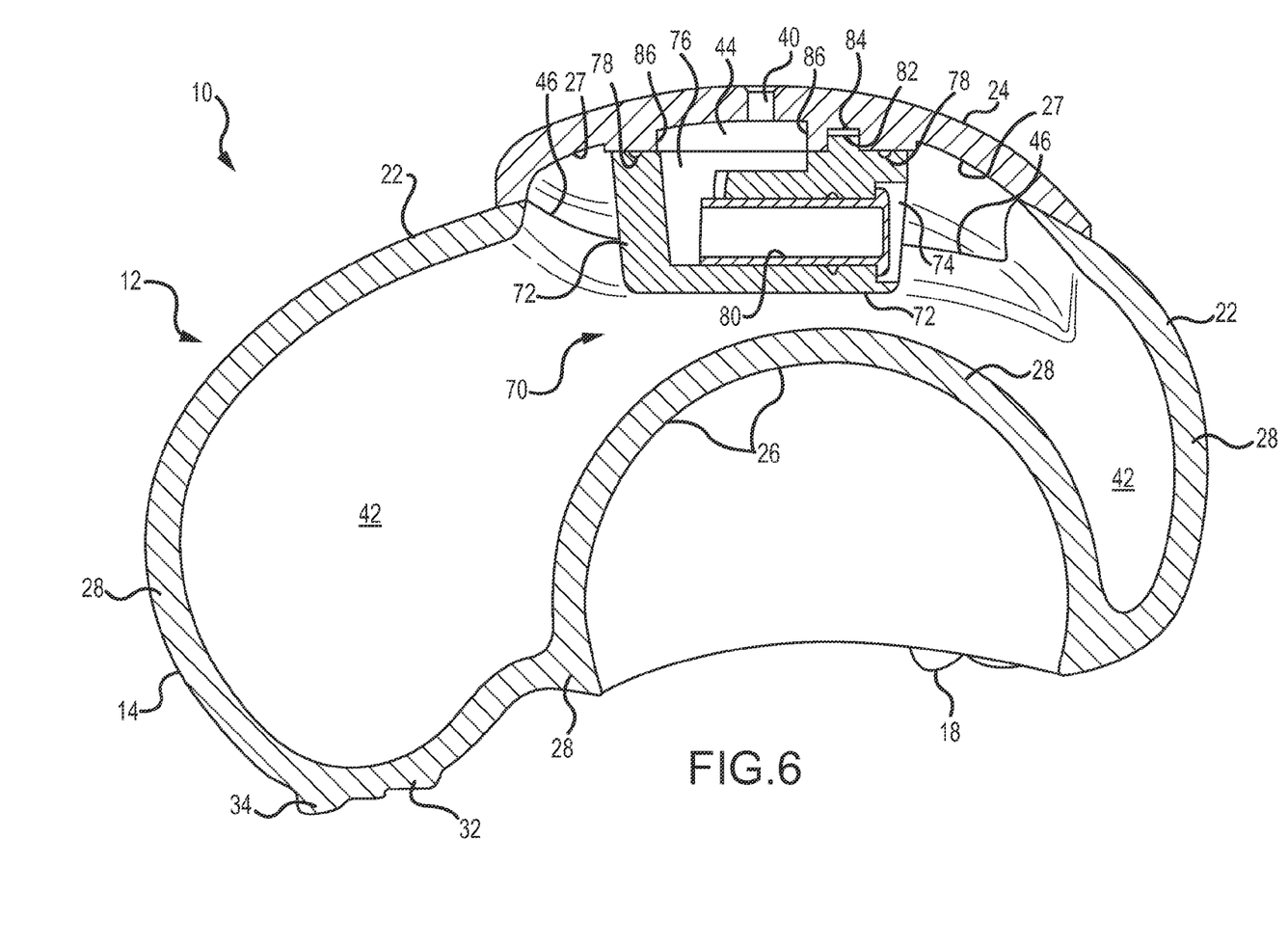
FIG. 6 is a cross-sectional view of the second embodiment incorporating the squeaker module of FIG. 5.

Referring also to FIG. 6, the module 70 is shown as being installed within the pet toy 10, and in which the cover 24 is modified to attach to the upper surface of the module 70. A recess 84 is formed on the interior surface 27 of the cover 24 that receives the alignment flange 82. The top surface of the module 70 is sealed with respect to a corresponding shaped interior cover extension 86. The sealing channel 78 may be filled with a sealing agent such as epoxy to further stabilize the attachment of the upper surface of the module and to seal the module to the interior surface 27 of the cover 24. Therefore according to the configuration shown in FIG. 6, the noise making module 70 is able to freely move with the movement of the cover 24 as it may deflect or compress during contact in the same way that the module 52 operates with the cover 24 in the first embodiment.

Figure 7:
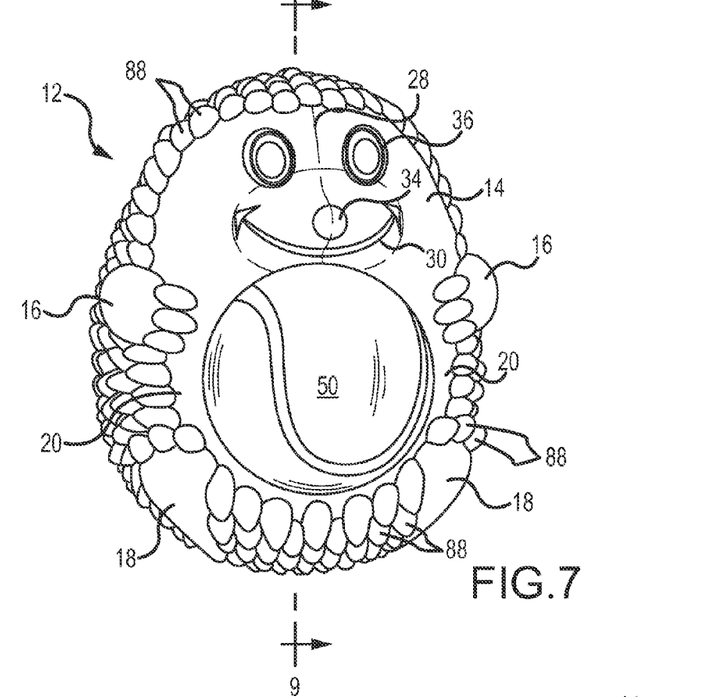
FIG. 7 is a front perspective view of a third embodiment of the invention.
Figure 8:
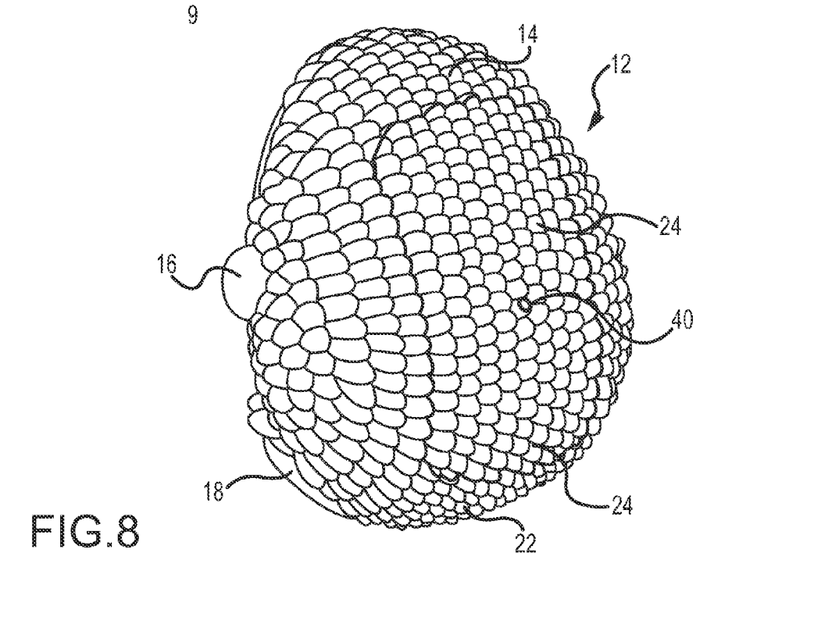
FIG. 8 is a reverse perspective view of the embodiment of FIG. 7.

FIGS. 7 and 8 illustrate a third embodiment in which the animal depicted resembles another rodent in the form of a porcupine. The same reference numerals are used to indicate the same structure in this embodiment as the previous embodiments. This embodiment further illustrates a plurality of irregular features or bumps 88 formed on the outer surface of the toy that may represent quills of the porcupine. These bumps 88 may survey functional purpose to clean the teeth and gums of the animal as it bites and chews the toy. Additionally, paste-like treats (not shown) may also be placed between the bumps 88 to encourage interaction with the animal, or teeth cleaning materials such as toothpaste (not shown) may be placed between the bumps 88 for dental cleaning.

Figure 9:
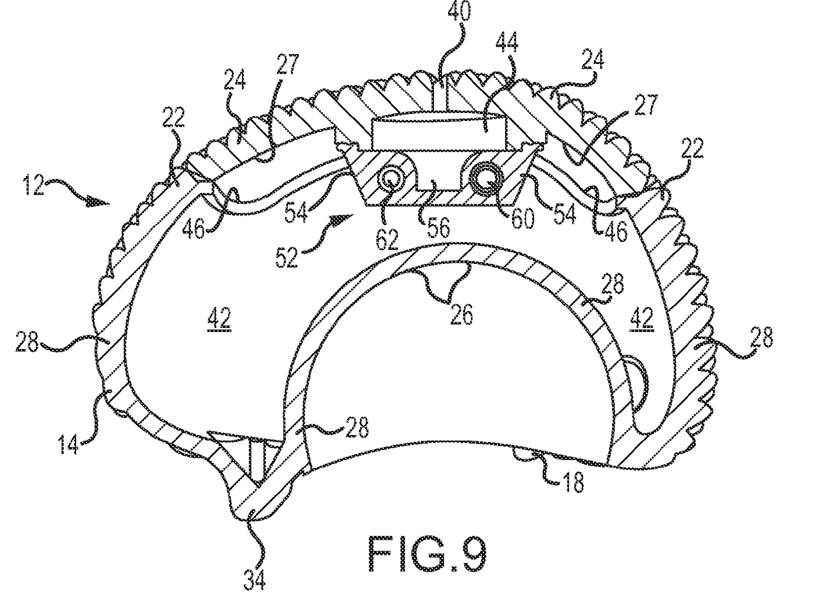
FIG. 9 is a cross-sectional view taken along line 9-9 of FIG. 7.

Referring to FIG. 9, the noisemaking module 52 is illustrated as being installed in the pet toy of FIGS. 7 and 8. The noisemaking module 52 is secured to the interior surface 27 of the cover 24 in the same manner as described with respect to FIG. 4.

Figure 10:
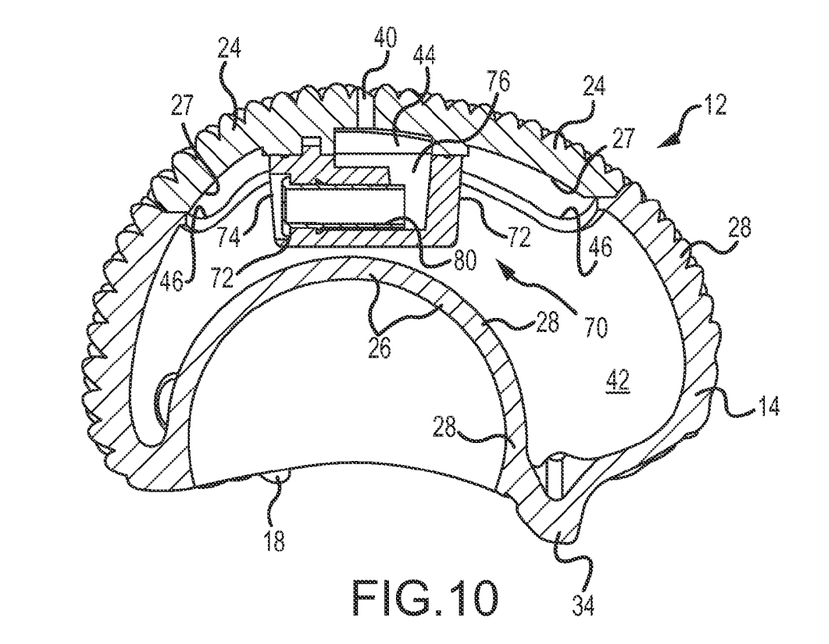
FIG. 10 is another cross-sectional view taken along line 9-9 of FIG. 7 but showing the squeaker module of FIG. 5.

FIG. 10 shows the noisemaking module 70 installed within the pet toy of FIGS. 7 and 8. As shown, the noisemaking module 70 is preferably secured to the interior surface 27 of the cover 24 in the same manner as described with respect to FIG. 6.

Figures 11, 12:
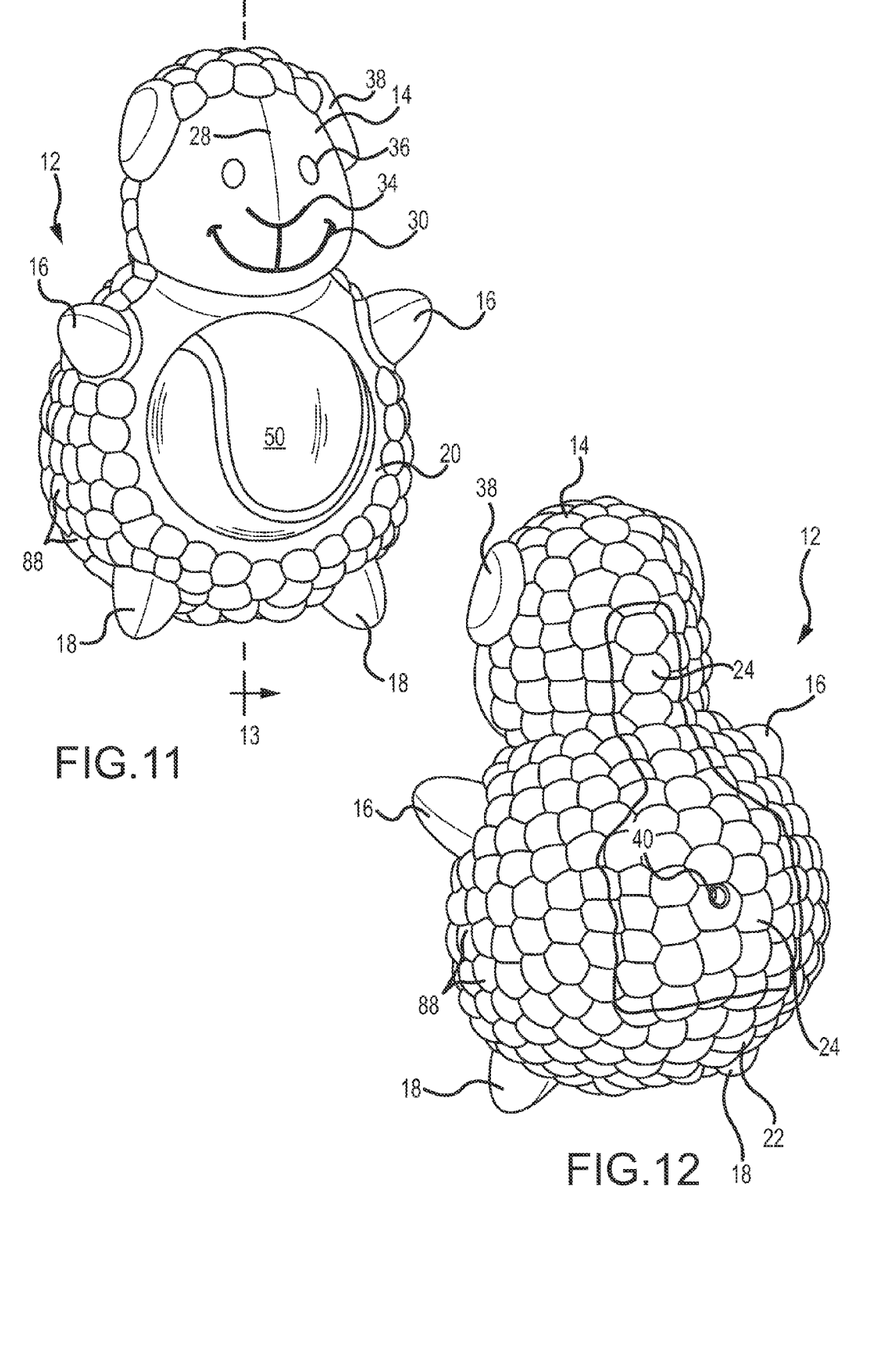
FIG. 11 is a front perspective view of a fourth embodiment of the invention.
FIG. 12 is a reverse perspective view of the embodiment of FIG. 11.

FIGS. 11 and 12 illustrate yet another embodiment of the invention in which the animal depicted resembles a sheep. The same reference numerals are used in this embodiment to indicate the same structure as the previous embodiments. The plurality of irregular features or bumps 88 formed on the outer surface of the toy may represent tufts of wool. As compared to the bumps shown in FIGS. 7 and 8, the bumps in FIGS. 11 and 12 are larger but still may serve a functional purpose to clean the teeth and gums of the animal as it bites and chews the toy.

Figure 13:
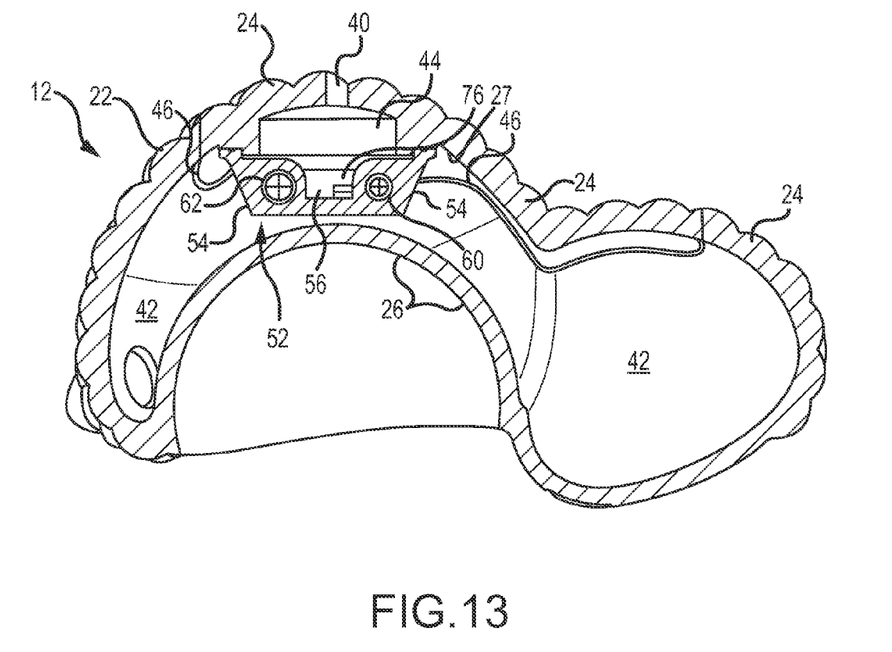
FIG. 13 is a cross-sectional view taken along line 13-13 of FIG. 11.

Referring to FIG. 13, the noisemaking module 52 is illustrated as being installed in the pet toy of FIGS. 11 and 12. The noisemaking module 52 is secured to the interior surface 27 of the cover 24 in the same manner as described with respect to FIGS. 4 and 9.

Figure 14:
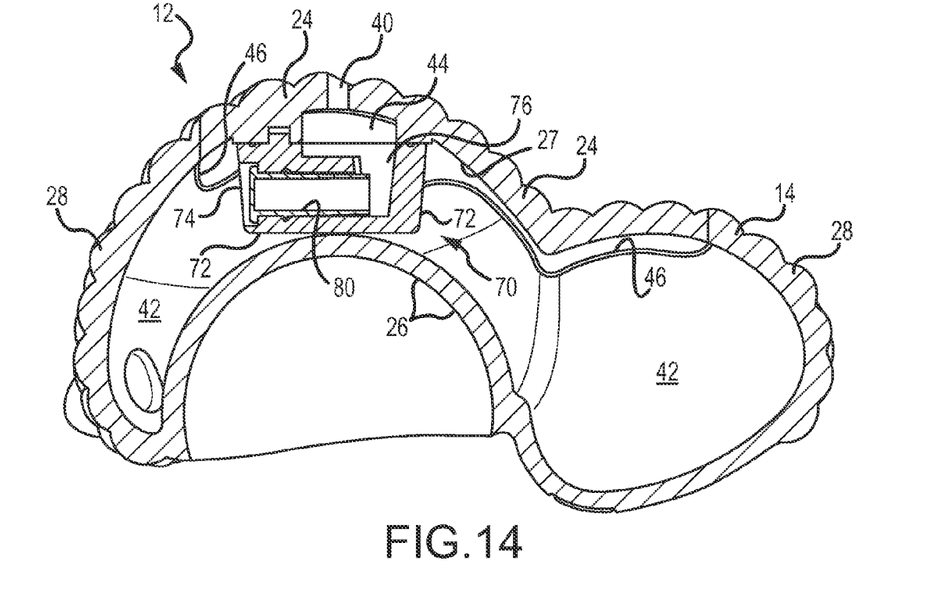
FIG. 14 is another cross-sectional view taken along line 13-13 of FIG. 11 but showing the squeaker module of FIG. 5.

FIG. 14 shows the noisemaking module 70 installed within the pet toy of FIGS. 11 and 12. As shown, the noisemaking module 70 is again preferably secured to the interior surface 27 of the cover 24 in the same manner as described with respect to FIGS. 6 and 10.

According to a method of the invention, a pet toy has a partial spherical shaped cavity to frictionally receive and hold a ball therein. The ball is selectively removed and replaced within the cavity so that options are provided for interacting with the animal. One option is for the ball to remain within the cavity. Another option is to remove the ball from the cavity so that the animal may interact separately with either the body of the toy or the ball. The cavity may be sized to receive a standard tennis ball in which the particular size and shape of the cavity can be selected to provide a greater or lesser capability for retaining the ball. For example, the cavity can be formed deeper into the body of the toy so that the exterior surface of the cavity covers a greater surface area of the ball when received in the cavity thereby making it more difficult to remove the ball. Conversely, the cavity can be formed in a shallower manner on the body of the toy that covers a smaller surface area of the ball thereby making it easier to remove the ball. The cavity may also be shaped so that the tennis ball must be slightly compressed to fit within the opening defined by the cavity, and this configuration may further assist in retaining the ball within the cavity.

Another method of the invention is to selectively activate the pet toy to produce desired sounds. The pet toy incorporates one or more noisemaking elements that produce sound when air flows through the noisemaking elements. Air flow is generated by a sufficient force applied to the pet toy to compress or alter the shape of the pet toy causing air to flow through the noisemaking elements as air escapes the pet toy. As the pet toy re-inflates, a second flow of air is generated through the pet toy, which may cause the noisemaking elements to again produce sound. Assuming that sufficient forces are applied to the toy, a plurality of different and unique tones can be produced. In addition to control of different combinations of tones, the volume of sound produced by the noisemaking elements may also be selectively controlled by choosing designs that produce variable sound volumes based upon the flow rate of air traveling through the noisemaking elements. In a preferred embodiment, the noisemaking elements are squeakers.

The invention has been described with respect to various preferred embodiments. It shall be understood however that the invention is not specifically limited to these described embodiments, and the invention should therefore be considered in connection with the scope of the claims appended hereto.

What is claimed is:

1. A pet toy comprising:
   a flexible body having:
   an exterior surface with a front portion and an opposite rear portion;
   a hollow interior chamber; and
   a partial spherical shaped recess formed on the front portion of said exterior surface;
   a ball received in said partial spherical shaped recess such that a corresponding first partial spherical shaped portion of an outer surface of said ball is covered by said recess, and a second partial spherical shaped portion of said outer surface is exposed and protrudes beyond said flexible body;
   a cover mounted over and connected to a portion of said flexible body;
   a noise making module disposed in said hollow interior chamber, said noise making module mounted between said flexible body and said cover; and
   a noise making element mounted within the noise making module to produce sound when a force is applied to said flexible body to deflect said exterior surface of said flexible body, wherein said noise making element does not extend through said cover.

2. The pet toy of claim 1, wherein: the noise making module is secured to an interior surface of said cover.

3. The pet toy of claim 1, wherein:
said cover is flexible and elastomeric; and
said cover includes a vent opening that communicates with a second recess defined as a space between said noise making module and said cover.

4. The pet toy of claim 1, wherein:
said noise making module communicates with said hollow interior chamber such that deflection of said exterior surface of said flexible body causes air to flow through said noise making element to produce sound, the deflection causing the air to flow out of said noise making module through a vent opening in said cover.

5. The pet toy of claim 1, wherein:
said cover is mounted to a rear portion of said flexible body and conforms in shape to said rear portion, said cover placed over an opening formed in said exterior surface at said rear portion to receive said cover.

6. The pet toy of claim 1, wherein:
said flexible body has a shape resembling a selected animal comprising at least one of a rodent or a sheep.

7. The pet toy of claim 1, wherein:
said outer surface of said ball is defined by said first partial spherical shaped portion and said second partial spherical shaped portion.

8. The pet toy of claim 1, wherein:
said flexible body includes a plurality of bumps formed on said exterior surface of said flexible body.

9. The pet toy of claim 1, wherein:
said partial spherical shaped recess forms a segment of a sphere and does not extend to the rear portion of said exterior surface; and
said ball when received in said partial spherical shaped recess resembles a belly of an animal.

10. The pet toy of claim 1, wherein:
said flexible body is elastomeric.

11. A pet toy comprising:
a flexible body having an exterior surface and a hollow interior chamber, said flexible body being formed in the shape of an animal having a head and a torso;
a cover connected to a portion of said flexible body;
a noise making module disposed in said hollow interior chamber and mounted between said flexible body and said cover;
a noise making element mounted in the noise making module to produce sound when a force is applied to said flexible body to deflect said exterior surface of said flexible body, wherein said noise making element is spaced from an interior surface of said cover;
a partial spherical shaped recess formed on said exterior surface;
a ball received in said partial spherical shaped recess such that a first spherical segment of an outer surface of said ball is covered by said recess, and a second spherical segment of said outer surface is exposed and protrudes beyond said flexible body; and
wherein said partial spherical shaped recess is formed on a front torso portion of said flexible body, and said ball when received in said partial spherical shaped recess resembles a belly of the animal.

12. The pet toy of claim 11, further including a vent opening in said cover.

13. The pet toy of claim 12, wherein:
said noise making module communicates with said hollow interior chamber such that deflection of said exterior surface of said flexible body causes air to flow through said noise making module and out of said vent opening to produce sound.

14. The pet toy of claim 11, wherein:
wherein said outer surface of said ball is defined by said first spherical segment and said second spherical segment.

15. The pet toy of claim 11, wherein:
said cover is flexible and elastomeric.

16. The pet toy of claim 11, wherein:
said cover is mounted to a rear torso portion of said flexible body and conforms in shape to said rear torso portion, said cover placed over an opening formed in said exterior surface at said rear torso portion to receive said cover.

17. The pet toy of claim 11, wherein:
said animal is at least one of a rodent or sheep.

18. The pet toy of claim 11, wherein:
said flexible body includes a plurality of bumps formed on said exterior surface of said flexible body.

19. The pet toy of claim 11, wherein:
said flexible body is elastomeric.

20. A pet toy comprising:
a flexible and elastomeric body having an exterior surface and a hollow interior chamber;
a first recess that is partially spherically shaped formed on said exterior surface;
an opening in said exterior surface communicating with said hollow interior chamber;
a cover mounted to said exterior surface over said opening;
a noise making module disposed in said hollow interior chamber between said flexible body and said cover;
a second recess defined as a space between said noise making module and said cover, said second recess remote from said first recess; and
a noise making element mounted in said noise making module to produce sound when a force is applied to said flexible body to deflect said exterior surface of said flexible body.

21. The pet toy of claim 20, further including:
a ball received in said first recess such that a first partial spherical shaped portion of an outer surface of said ball is covered by said first recess, and a second partial spherical shaped portion of said outer surface is exposed and protrudes beyond said flexible body.

22. The pet toy of claim 21, wherein:
said flexible body is formed in the shape of an animal having a head and a torso; and
said first recess is formed on a front torso portion of said torso, and said ball when received in said first recess resembles a belly of the animal.

23. The pet toy of claim 21, wherein said outer surface of said ball is defined by the first partial spherical shaped portion and the second partial spherical shaped portion.

24. The pet toy of claim 20, further comprising a vent opening formed through said cover, said vent opening communicating with said second recess.

25. A method of providing interaction between an animal and a pet toy, said method comprising:
providing the pet toy having:
(i) a flexible body having an exterior surface and a hollow interior chamber;
(ii) a partial spherical shaped recess formed on said exterior surface;
(iii) a ball received in said partial spherical shaped recess such that a corresponding first partial spherical shaped portion of an outer surface of said ball is covered by said recess, and a second partial spherical shaped portion of said outer surface is exposed and protrudes beyond said flexible body;

(iv) a cover mounted over and connected to a portion of said flexible body; and (v) a noise making module disposed in said hollow interior chamber and mounted between said flexible body and said cover, said module having a noise making element mounted therein such that said noise making element does not extend through said cover;

giving the pet toy to the animal allowing the animal to bite or chew on the pet toy, wherein deflection of the flexible body in response to biting or chewing produces a sound by said noise making element; and removing the ball from said partial spherical shaped recess enabling the animal to independently play with the ball or the flexible body.

\* \* \* \* \*